(12) United States Patent
Turner, Jr.

(10) Patent No.: US 9,587,381 B2
(45) Date of Patent: Mar. 7, 2017

(54) SYSTEM, AND ASSOCIATED METHOD, FOR RECOVERING WATER FROM AIR

(71) Applicant: J. Glenn Turner, Jr., Dallas, TX (US)

(72) Inventor: J. Glenn Turner, Jr., Dallas, TX (US)

( * ) Notice: Subject to any disclaimer, the term of this patent is extended or adjusted under 35 U.S.C. 154(b) by 0 days.

(21) Appl. No.: 14/949,808

(22) Filed: Nov. 23, 2015

(65) Prior Publication Data
US 2016/0145838 A1    May 26, 2016

Related U.S. Application Data (60) Provisional application No. 62/083,168, filed on Nov. 22, 2014.

(51) Int. Cl.
| | |
|---|---|
| C02F 1/14 | (2006.01) |
| C02F 1/18 | (2006.01) |
| E03B 3/28 | (2006.01) |
| B01D 5/00 | (2006.01) |
| F24F 3/14 | (2006.01) |

(52) U.S. Cl.
CPC ............... E03B 3/28 (2013.01); B01D 5/009 (2013.01); B01D 5/0015 (2013.01); B01D 5/0042 (2013.01); F24F 3/1405 (2013.01)

(58) Field of Classification Search
CPC ....... E03B 3/28; B01D 5/0042; B01D 5/0066; B01D 5/009; B01D 5/00; Y02W 10/37; C02F 1/18; C02F 1/14; F24F 5/0042
See application file for complete search history.

(56) References Cited

U.S. PATENT DOCUMENTS

| | | | | |
|---|---|---|---|---|
| 3,400,516 | A | * 9/1968 | De Leon | ............ B01D 46/0004 210/259 |
| 3,789,582 | A | * 2/1974 | Graybill | ................. F02M 35/02 261/79.2 |
| 4,184,338 | A | 1/1980 | Bennett | |
| 4,290,273 | A | 9/1981 | Meckler | |
| 5,517,829 | A | * 5/1996 | Michael | .................... E03B 3/28 210/669 |
| 5,729,981 | A | * 3/1998 | Markus | ..................... E03B 3/28 62/235.1 |

(Continued)

OTHER PUBLICATIONS

Atta, Raghied Mohammed, Solar Water Condensation Using Thermoelectric Coolers, Abstract, Int'l Journal of Water Resources and Arid Environments 1(2), pp. 142-145, ISSN 2079-7079, 2011.

(Continued)

*Primary Examiner* — Frantz Jules
*Assistant Examiner* — Martha Tadesse
(74) *Attorney, Agent, or Firm* — Jack D. Stone, Jr.; Scheef & Stone, L.L.P.

(57) ABSTRACT

A system for condensing water from air includes a column having a substantially non-reflective surface effective for absorbing heat energy from the sun and transferring the heat to air in the interior of the column. A condenser is secured within the column, and includes a channel having a condensing surface with a thermoelectric or natural gas cooler positioned thereon for cooling the condensing surface. A collector is positioned within the column for collecting water that condenses on and flows through the channel, and an accumulator is coupled in fluid communication with the collector for accumulating the water.

18 Claims, 8 Drawing Sheets

(56) References Cited

U.S. PATENT DOCUMENTS

| | | | |
|---|---|---|---|
| 5,846,296 A * | 12/1998 | Krumsvik | B01D 5/0066 95/115 |
| 6,116,034 A | 9/2000 | Alexeev et al. | |
| 6,367,261 B1 * | 4/2002 | Marshall | F01K 9/00 60/670 |
| 6,574,979 B2 * | 6/2003 | Faqih | B01D 5/0006 62/285 |
| 6,684,648 B2 | 2/2004 | Faqih | |
| 7,337,615 B2 | 3/2008 | Reidy | |
| 7,467,523 B2 | 12/2008 | Vetrovec et al. | |
| 7,478,535 B2 | 1/2009 | Turner, Jr. | |
| 7,887,622 B1 | 2/2011 | Turner, Jr. | |
| 9,132,382 B2 * | 9/2015 | Goelet | B01D 5/00 |
| 2002/0046569 A1 * | 4/2002 | Faqih | B01D 5/009 62/188 |
| 2003/0159457 A1 | 8/2003 | Faqih | |
| 2005/0044862 A1 * | 3/2005 | Vetrovec | B01D 5/0066 62/93 |
| 2006/0279167 A1 * | 12/2006 | Turner | E03B 3/28 310/307 |
| 2006/0288709 A1 * | 12/2006 | Reidy | B01D 5/0042 62/3.4 |
| 2009/0293724 A1 * | 12/2009 | Ivison | B01D 53/265 95/288 |
| 2012/0037343 A1 * | 2/2012 | Mielke | B01D 5/0027 165/104.21 |

OTHER PUBLICATIONS

Nandy, Aditya et al., A Project on Atmospheric Water Generator with the Concept of Peltier Effect, Abstract, Int'l Journal of Advanced Computer Research; vol. 4, No. 2, Issue 15, pp. 481-486, ISSN 2249-7277, Jun. 2014.

* cited by examiner

SYSTEM, AND ASSOCIATED METHOD, FOR RECOVERING WATER FROM AIR

CROSS-REFERENCE TO RELATED APPLICATIONS

This application claims the benefit of U.S. Provisional Application No. 62/083,168, filed Nov. 22, 2014, which application is hereby incorporated herein by reference, in its entirety.

TECHNICAL FIELD

The invention relates generally to recovering water from air, and, more particularly, to condensing and collecting water that has been absorbed into humid air, also known as the atmosphere.

BACKGROUND

The supply of water, and clean water in particular, has progressively become a serious problem in many parts of the world. The ground water level sinks, severe droughts occur, landscapes dry up, and deserts spread. The water which exists in these areas is generally very highly polluted, which in turn can lead to disease among both people and animals, with infections, which can result in major disasters.

Many attempts have been made to supply such problem areas with water in some form or other, either by drilling to great depths in the soil to create water wells and recover water from under the ground, or by damming up and channeling as needed water on the surface of the ground. However, there are regions in which water may not be recovered from under the ground via wells, and no water is available on the surface of the ground that may be dammed and channeled, and such techniques are therefore not available.

Where sea water is available, plants have been developed for purifying such water in order to provide drinking water. However, sea water is not always available, or is only available via extensive pipeline systems, and such plants are generally prohibitively expensive to build, and require substantial energy to operate.

Where water is not available either under the ground or on the surface of the ground, and sea water is not readily available, attempts have been made to recover moisture from the atmosphere, that is, by recovering water which exists in humid air. Techniques which have heretofore been developed for recovering water from air require complex equipment, such as evaporators, condensers, large fans to force air through a system, and/or the like, and substantial space for such equipment, as well as substantial energy to operate such equipment.

Accordingly, a continuing search has been directed to the development of systems and methods which can recover water from the atmosphere, which systems and methods do not require complex equipment and substantial amounts of space and energy to operate.

SUMMARY

The present invention, accordingly, provides an apparatus for recovering water from air. The apparatus includes a funnel having a non-reflective surface oriented for receiving and absorbing heat energy from the sun, and an upwardly-oriented vertex end defining a vertex opening, and a downwardly-oriented base end defining a base opening larger than the vertex opening. The funnel is preferably supported on legs positioned proximate to the base opening of the lower funnel. An upwardly extending column having a relatively non-reflecting exterior surface is attached to the vertex opening for facilitating fluid communication by convection from the funnel to the column. A condensing surface is secured within a channel defined within the interior of the column, and at least one thermoelectric cooler or continuous absorption cooler operable by the application heat furnished by gas is positioned on the condensing surface for cooling the condensing surface. A collector is positioned within the column for catching water that condenses on, and drips from, the condensing surface, and flows through the channel. The collector is connected in fluid communication with an accumulator for receiving and accumulating condensate received by the collector.

In the operation of the invention, the funnel is heated from sunlight, and heat is transferred from the funnel to air inside the funnel, causing the air to rise into, and flow through, the column. Water in the air condenses on the condensing surface, drips from the condensing surface, flows through the channel, is caught by the collector, and accumulated in the accumulator for access by a user.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. Additionally, for the most part, details concerning thermoelectric coolers, continuous absorption coolers, solar panels, and the like, have been omitted inasmuch as such details are not considered necessary to obtain a complete understanding of the present invention, and are considered to be within the skills of persons of ordinary skill in the relevant art.

Refer now to the drawings wherein depicted elements are, for the sake of clarity, not necessarily shown to scale and wherein like or similar elements are designated by the same reference numeral through the several views.

Figure 1:
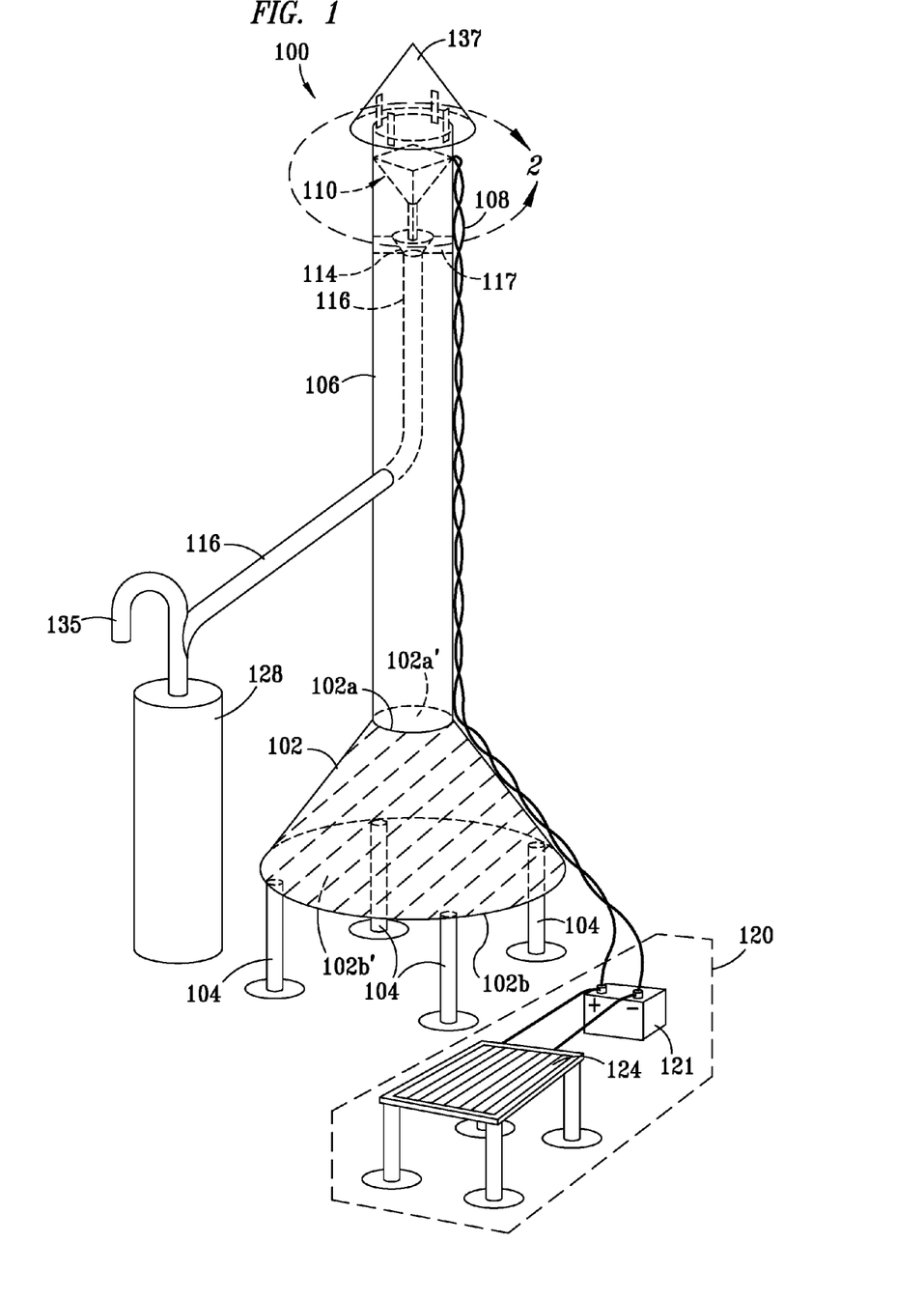
FIG. 1 exemplifies a perspective view of a water recovery system embodying features of the present invention.

In FIG. 1 of the drawings, the reference numeral 100 generally designates a water recovery system embodying features of the present invention. System 100 preferably includes a frusto-conical skirt or funnel 102, preferably supported on four legs 104, though any number of legs may be utilized in support of the funnel, or legs may be omitted and openings formed in the funnel 102 to permit the inflow of air. Funnel 102 is preferably fabricated from a sheet of thermally conductive material, such as sheet metal, and includes a vertex 109, or upper, end 102a defining a vertex, or upper, opening 102a', and a base, or lower, end 102b defining a base, or lower, opening 102b' larger than the vertex opening 102a'. The exterior surface of funnel 102, and optionally, the interior surface as well, are preferably substantially non-reflective heat-absorbing surfaces, such as, for example, black surfaces, or other dark colored substantially non-reflective heat-absorbing surfaces.

A column 106 is mounted over upper opening 102a' of funnel 102. Column 106 is preferably fabricated from sheet metal, having a cross-section which is preferably circular, and includes an exterior surface, and optionally, an interior surface as well, which is substantially reflective, being, for example, metallic, white, or other substantially light-reflective color. Alternatively, depending on air temperature and humidity and exposure to sunlight, it may be advantageous for facilitating convection for all or a portion of the exterior surface, and optionally, interior surface as well, of the column 106 to be substantially non-reflective, being, for example, black, or other substantially dark color, or some grade of reflectivity that is partially reflective and non-reflective. While the cross-section of column 106 is exemplified as being circular, it may alternatively be any of a number of different shapes, such as square, triangular, or the like. A cover 137 is preferably positioned atop column 106 for preventing debris in the air from falling into the condenser and accumulator.

Figure 2:
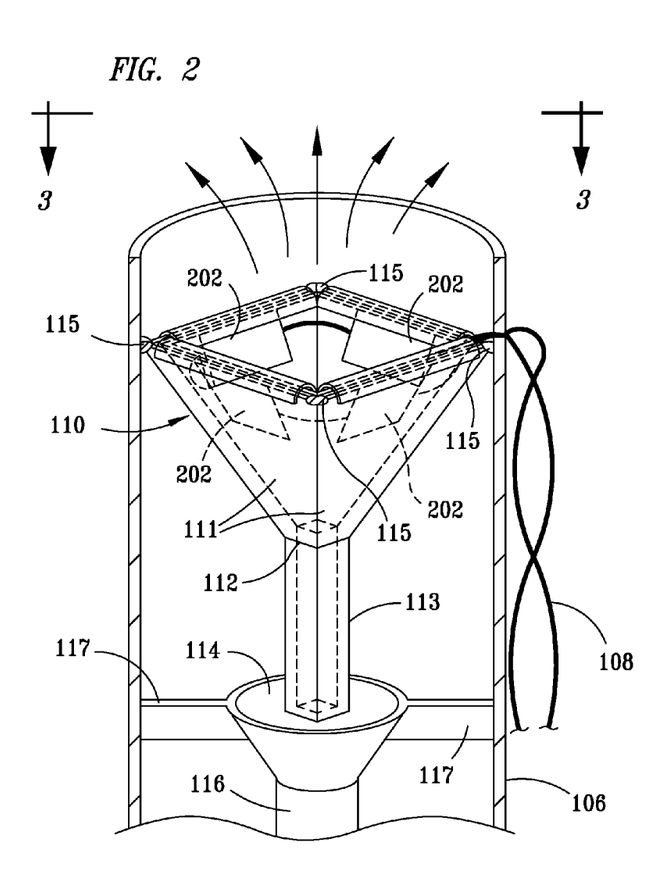
FIG. 2 exemplifies a partially cut-away perspective view of an interior of a condenser adapted for use in the system of FIG. 1.

A condenser 110 is positioned within an upper portion of column 106, and, as shown and described in greater detail below with respect to FIGS. 2-4, preferably comprises four substantially flat interior sides, or walls, 111 configured to form a funnel in the shape of an inverted pyramid. Alternatively, condenser 110 may be configured in any of a number of different ways, and may, by way of example, have more or less than four walls, or assume alternative configurations, such as a conical shape, as discussed below. Walls 111 are preferably fabricated from a thermally conductive material, such as sheet metal. A channel 126 extends downwardly from an opening formed at vertex 109 of condenser 110, and fluid communication is thereby established between the interior of condenser 110 and the interior of channel 126. Four exterior walls 112 and 113 are formed outside of respective interior walls 111 and 125, the interior and exterior walls being substantially parallel to each other. A flow channel 118 is defined between interior walls 111 and exterior walls 112, and a channel 126 is defined between interior walls 125 and exterior walls 113. An upper end of interior walls 111 is formed into an arcuate shape 119 which extends over exterior walls 112 and is open for capturing air currents that flow upwardly through column 106, as discussed further below. Walls 112, 113, and 125 are preferably fabricated from material, such as plastic, that is relatively ineffective for conducting heat. The exterior surfaces of exterior walls 112 and 113 are preferably insulated with insulation 127. Similarly, the interior surfaces of interior walls 125 are preferably insulated with insulation 122. As shown most clearly in FIG. 3, condenser 110 is preferably secured in column 106 by tack welding each of four corners 115 of condenser 110 to the interior wall of column 106. Alternatively, condenser 110 may be secured in column 106 using any other conventional means, such as support arms or braces extending between condenser 110 and column 106, similar to support arms or braces 117 extending between a collector 114 (discussed below) and column 106, described below with respect to FIGS. 2 and 4.

Collector 114 is preferably positioned within column 106 under condenser 110 for receiving water that drips from vertex 109 and walls 113. Collector 114 is preferably conically-shaped, and is supported therein using any conventional means, such as a plurality of metal arms or braces 117 extending between collector 114 and column 106, or (not shown) between collector 114 and walls 113. In an alternative embodiment, collector 114 is joined to walls 113 to form a substantially air-tight seal between collector 114 and walls 113 and to provide additional support for condenser 110.

A conduit 116, such as a tube or hose, is preferably connected in fluid communication between collector 114 and an accumulator 128, such as a drum, and extends through the wall of column 106, for facilitating the flow of water from collector 114 to accumulator 128. A vent 135 may optionally be provided on the conduit 116. In an alternative embodiment of the invention, conduit 116 is connected directly to walls 113 to form a substantially air-tight seal between walls 113 and conduit 116, and to provide additional support for condenser 110, rendering collector 114 unnecessary.

Accumulator 128 is configured for accumulating and storing water captured by collector 114, and, but for conduit 116, is preferably closed and sealed at the top, though it may alternatively be open-topped. While not shown, accumulator 128 preferably also includes means, such as a valve positioned in a lower portion of accumulator 128, for enabling a user to conveniently draw water from the accumulator in a manner well-known in the art. Accumulator 128 is preferably positioned laterally and externally of funnel 102, but may alternatively be centrally positioned directly under funnel 102 and condenser 110, with conduit 116 running straight downwardly from collector 114 to accumulator 128.

System 100 further includes an electrical power source 120, preferably comprising one or more batteries 121 and solar panels 124, which are preferably configured in a conventional manner for working together so that power may be supplied from the battery when there is little or no sunshine to energize the solar panels. Electrical power source 120 is connected via wires 108 for supplying electrical power to the certain components of condenser 110, described further below. Electrical power source 120 is preferably self-contained, needing no external power supply, though external electrical power may optionally be made available through conventional power sources, as needed, should electrical power source 120 be unable to supply the quantity of power needed by condenser 110.

At least one Peltier Junction Module, or thermoelectric cooler (TEC), 202 is preferably positioned on an interior surface of each interior wall 111 so that, when energized, the TECs absorb heat from, and thereby cool, the walls 111 of condenser 110. TECs 202 are electrically coupled via wires 108 to power source 120, and may be interconnected in any conventional manner, such as by a parallel or serial circuit. While not shown, TECs 202 are preferably provided with heat sinks on a side opposing walls 111 for dissipating heat absorbed by the TECs. TECs, such as described herein, are considered to be well-known in the art and, therefore, will not be described in further detail herein, except insofar as necessary to describe the invention. Alternatively, any suitable method for cooling interior walls 111 may be used, such as, by way of example, a continuous absorption type of cooling unit operated by the application of a limited amount of heat furnished by gas.

Figure 3:
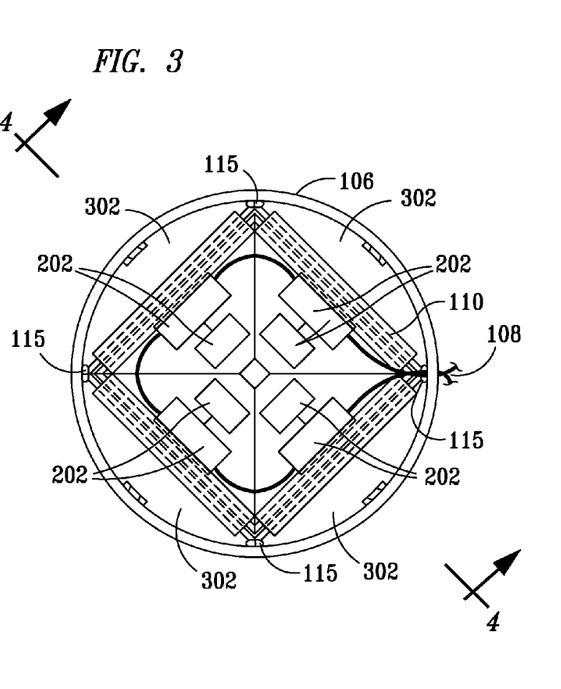
FIG. 3 presents a plan view of the condenser of FIG. 2 taken along the line 3-3 of FIG. 2.

FIG. 3 depicts a plan view of condenser 110 within column 106. As exemplified most clearly therein, TECs 202 are preferably serially connected to wires 108, though they may alternatively be connected in parallel. Also shown in FIG. 3 are spaces 302 between column 106 and condenser 110, to thereby facilitate the upward flow of air through column 106 and past condenser 110, for reasons discussed in further detail below.

In operation, system 100 is preferably positioned so that funnel 102 is exposed to the heat of sunlight which is absorbed by, and thereby heats, the dark or black surface of funnel 102. Heat from the surface of funnel 102 heats air inside funnel 102, causing the air to convectively rise up in funnel 102 through vertex opening 102a', and into column 106, as indicated by arrows 107. The air is then captured by arcuate bends 119 and directed through channels 118 and 126. Electrical power is applied to the TECs 202 to cause them thereby to cool walls 111 of condenser 110. As heated air passes through channel 118 and over cooled walls 111, water in the air condenses onto surfaces of channel 118. The condensed water then flows, from the force of gravity, downwardly through channels 118 and 126, and into collector 114. Water caught by collector 114 then flows, as indicated by an arrow 130, through conduit 116 to accumulator 128, where it is made available for use by a user (not shown) in a conventional manner.

As air in channel 118 is cooled, it flows downwardly through the channels 118 and 126, as indicated by arrows 107. The downward flow of air in channels 118 and 126 creates a pressure drop at the top of channel 118 which draws new warmer air in funnel 102 into channel 118, thereby maintaining a flow of air from funnel 102 through channels 118 and 126. As the TECs 202 heat the air in cavity 134, the air rises, creating a pressure drop at the bottom of channel 126, which draws cooled air from channel 126 upwardly, as indicated by arrows 132, into cavity 134. It may be appreciated that a continual flow of air is maintained from funnel 102, downwardly into channels 118 and 126, upwardly into cavity 134 and back into the atmosphere.

Figure 4:
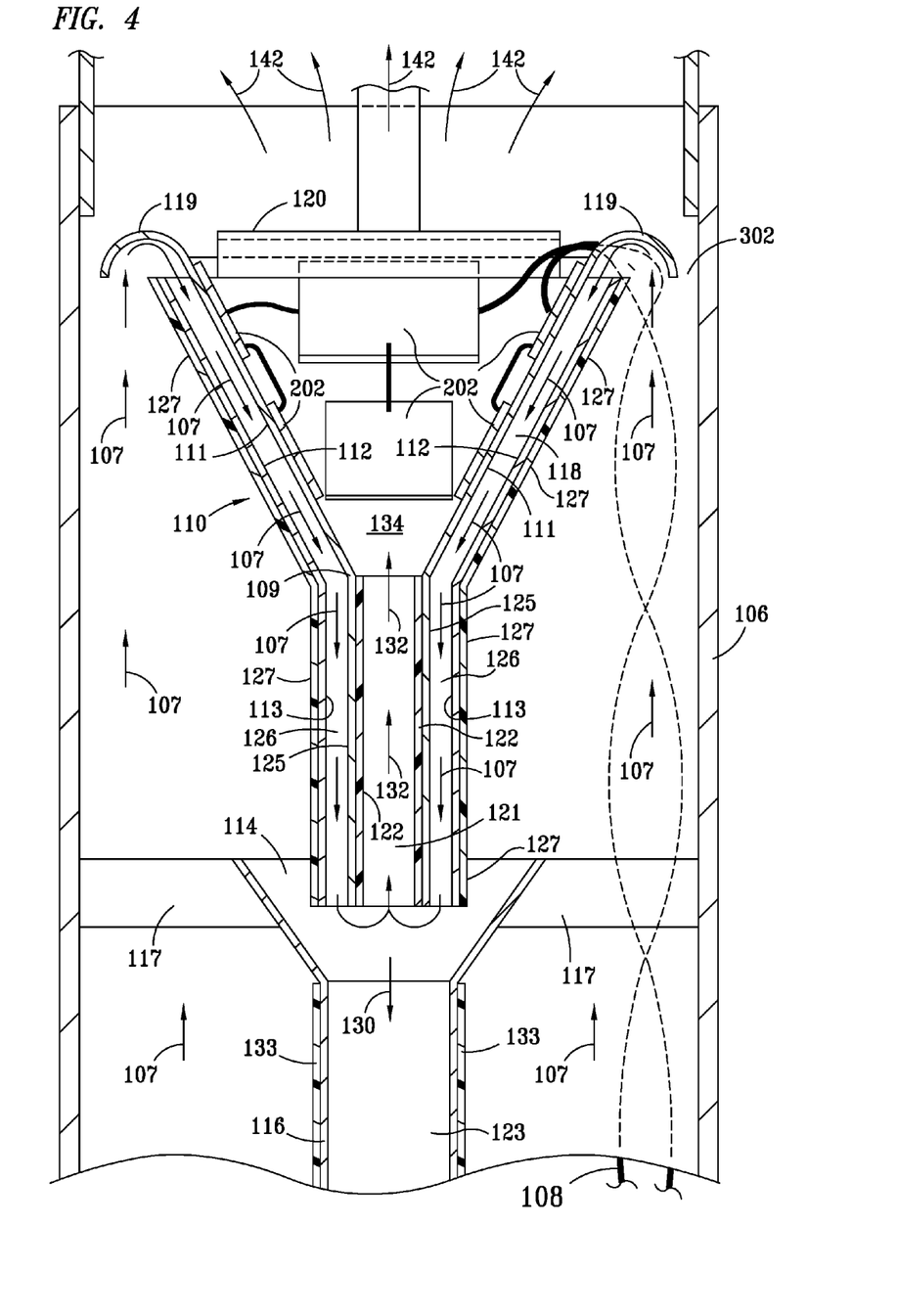
FIG. 4 presents a cross-sectional view of the condenser of FIG. 2 taken along the line 4-4 of FIG. 3.
Figure 5:
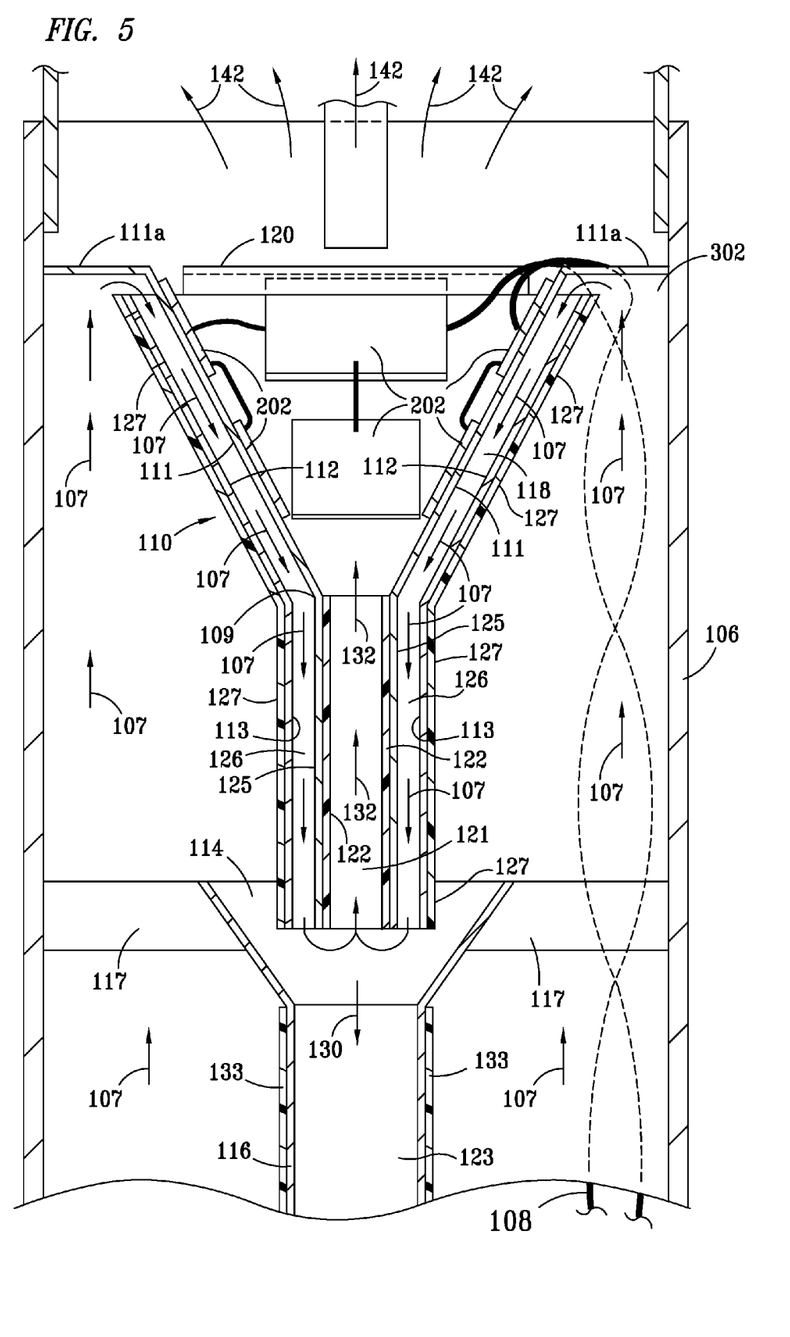
FIG. 5 exemplifies an alternative embodiment of the invention of FIG. 4 wherein the column is sealed so as to force all upward-flowing air through the condenser.

FIG. 5 exemplifies an alternative embodiment of the invention of FIG. 4 wherein the column is sealed by a wall 111 substantially flat horizontal extension so as to force all upward-flowing air through condenser 100 as indicated by arrows 107. Operation of the embodiment of FIG. 5 is otherwise similar to the operation of the embodiment of FIGS. 1-4.

Figure 6:
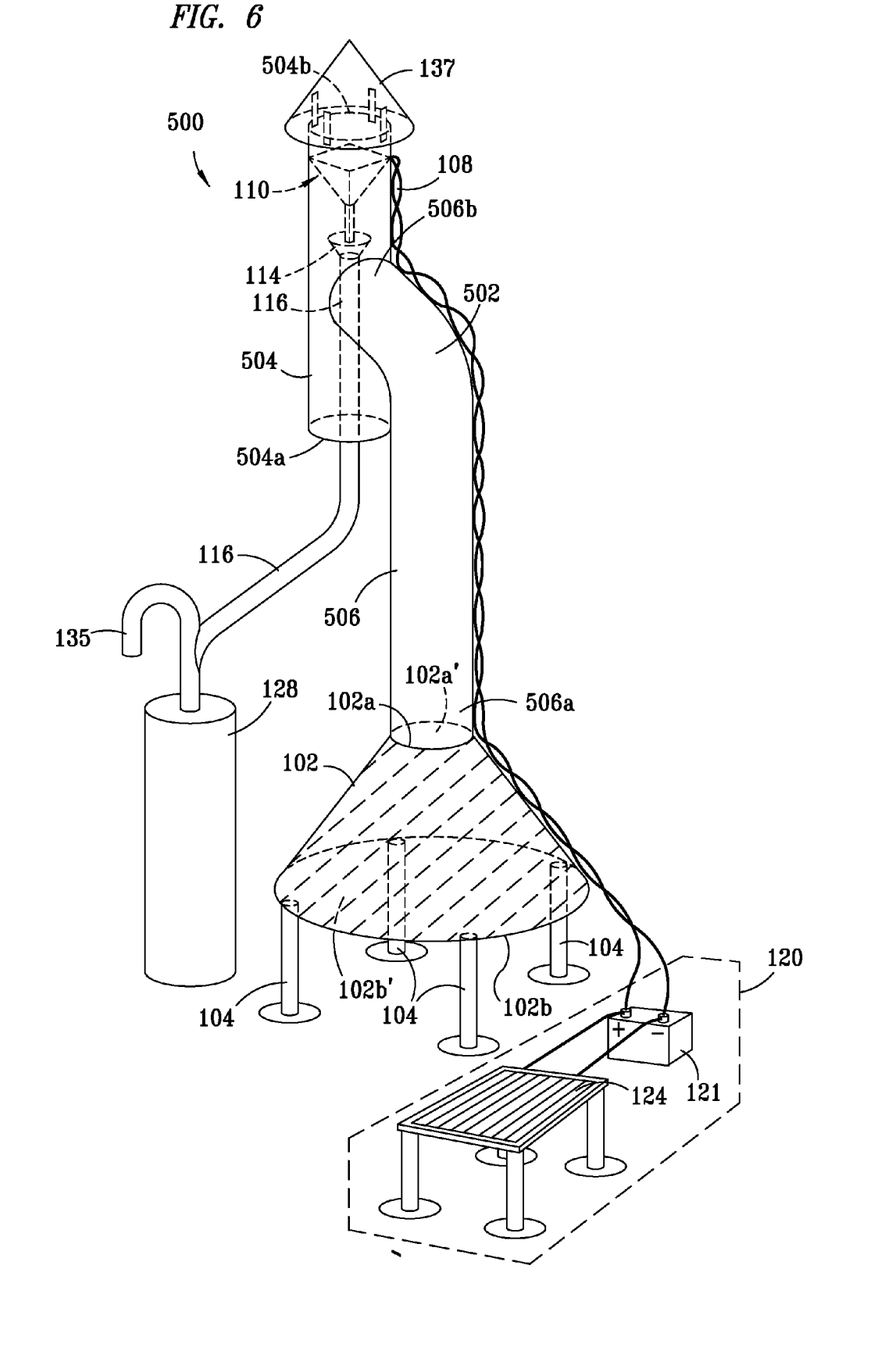
FIG. 6 exemplifies an alternative embodiment of the water recovery system of FIG. 1 embodying features of the present invention.

FIG. 6 depicts the details of a water recovery system 500 according to an alternate embodiment of the present invention. Since water recovery system 500 contains many components that are substantially identical to those of the previous embodiment 100, such components are referred to by the same reference numerals and will not be described in any further detail. According to the embodiment of FIG. 5, column 106 is replaced by a primary column 506 having a bend 502 formed between a lower portion 506a and an upper portion 506b of column 506. Lower portion 506a of column 506 is connected in fluid communication to funnel 102, and upper portion 506b of column 506 is connected in fluid communication to a central portion of an auxiliary column 504. Auxiliary column 504 is preferably a substantially straight, vertically extending column which defines an open lower end 504a and an open upper end 504b. Condenser 110 and collector 114 are positioned within auxiliary column 504 between the open upper end 504b of auxiliary column 504 and the connection of upper portion 506b of column 506 to auxiliary column 504, and are secured thereto similarly as described above with respect to FIGS. 1-5. In further contrast to the water recovery system 100, wherein conduit 116 extends through the wall of column 106, in the water recovery system 500, conduit 116 preferably runs downwardly through the open lower end 504a of auxiliary column 504.

Operation of the water recovery system 500 is similar to the operation of water recovery system 100, the only material difference being that warm humid air passes from primary column 506 to auxiliary column 504 before passing over condenser 110.

Figure 7:
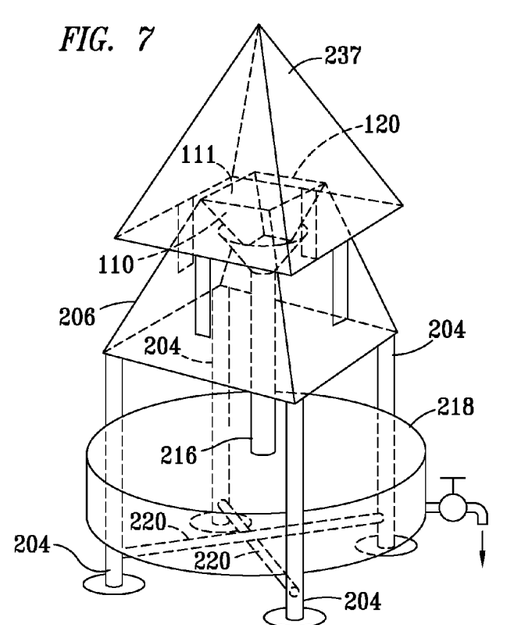
FIG. 7 exemplifies an alternative embodiment of the invention made more compact by forgoing the column and forcing all upward-flowing air through the condenser.
Figure 8:
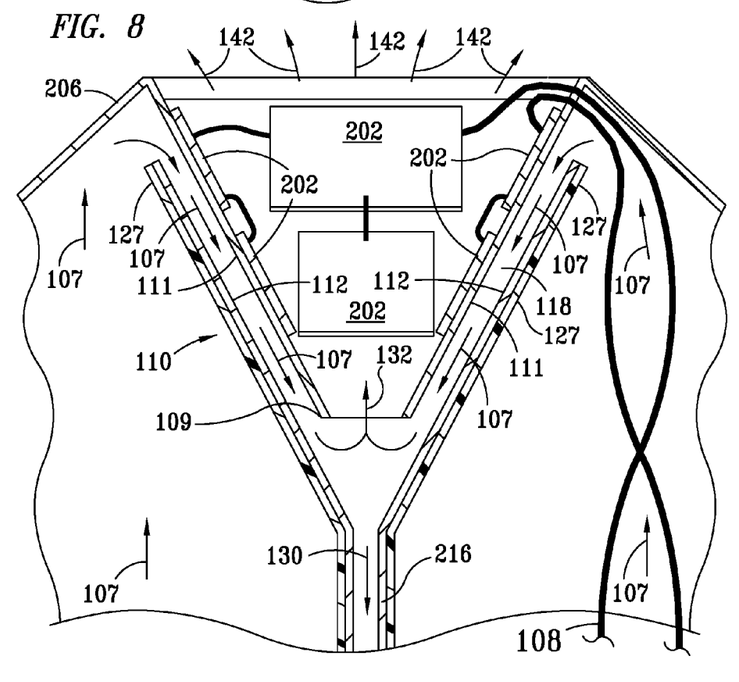
FIG. 8 presents detail of a condenser of the embodiment of FIG. 7.

FIGS. 7 and 8 exemplify an alternative, more streamlined embodiment of the invention. A skirt 206 preferably comprises sheet material in the shape of a four-panel frustum, or alternatively a frusto-conical shape, the sheet material being a heat-absorbing thermally conductive material, such as sheet metal having a black exterior, and supported by legs 204. Skirt 206 is preferably used to perform the functions of funnel 102 and column 106 of heating air and directing the heated air into condenser 110, and are connected directly to the upper edges of interior walls 111. Accumulator 128 is replaced by accumulator 218 which is positioned directly beneath condenser 110. Accumulator 218 is connected via a conduit 216 to exterior walls 112 for collecting condensate condensed on walls 111. A cover 237 is provided for preventing debris in the air from falling into the condenser and accumulator.

In the operation of the embodiment of FIGS. 7 and 8, heat energy from the sun heats skirt 206 which heats air under skirt 206. Warm heated air under skirt 206 rises, enters channel 118, and then passes by wall 111 which is cooled by TECs 202. Water in the air is then condensed out and passes downwardly through channel 118 and conduit 216, as indicated by arrow 130, into accumulator 218. After the water is condensed out, the air flows upwardly as indicated by arrows 132 and 142, returning to the ambient air. The upward flow of air is facilitated by heat absorbed and dissipated by TECs 202.

Figure 9:
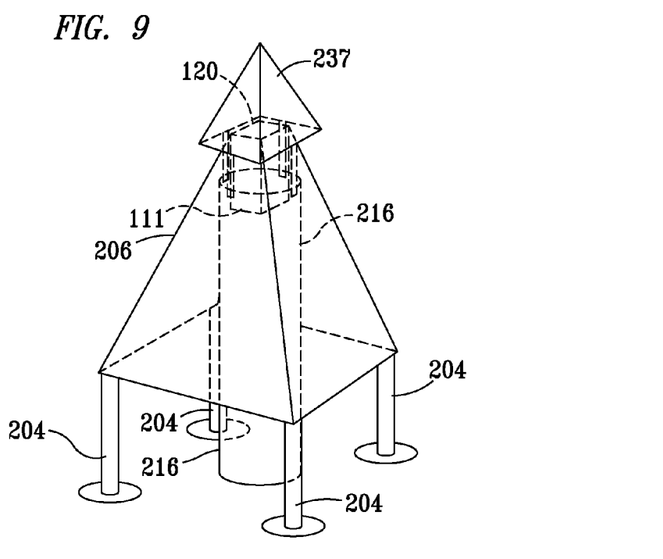
FIG. 9 exemplifies an alternative embodiment of the invention of FIG. 7 wherein the accumulator forms an integral portion of the condenser.
Figure 10:
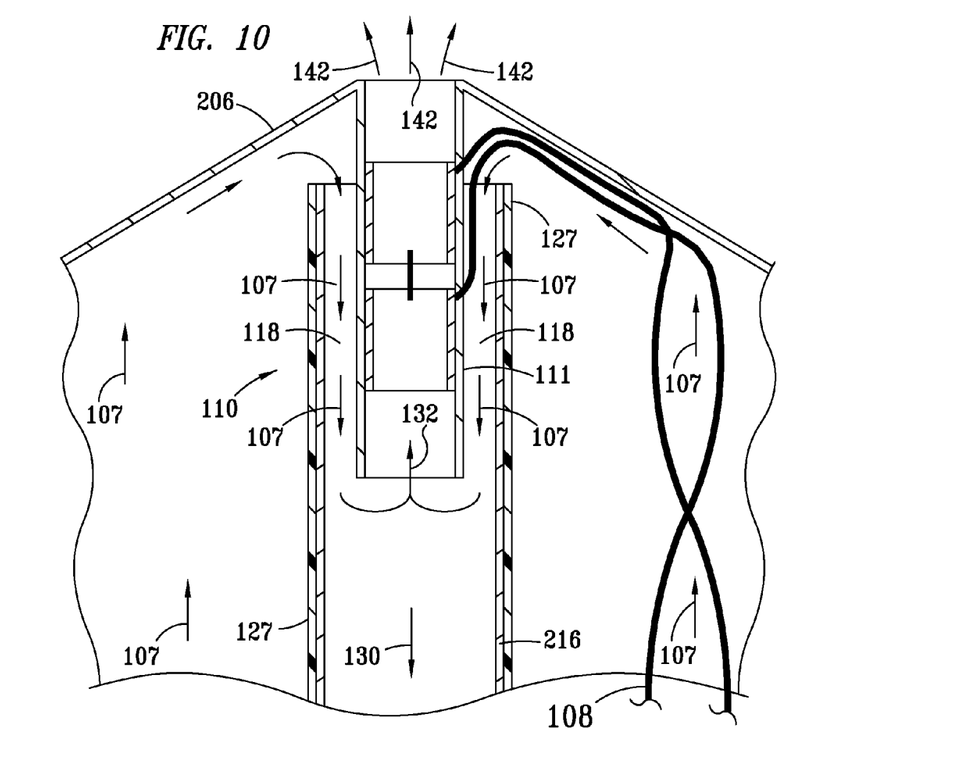
FIG. 10 presents detail of a condenser and accumulator of the embodiment of FIG. 9; and, FIG. 11 exemplifies a water recovery system according to a further alternative embodiment of the present invention.

FIGS. 9 and 10 exemplify an alternative embodiment of the invention of FIGS. 7 and 8, wherein the accumulator 218 forms an integral and streamlined portion of the condenser 110. Interior walls 111 of condenser 110 are preferably substantially vertical, and the walls of accumulator 218 extend upwardly to envelope walls 111. Operation of the embodiment of FIGS. 9 and 10 is similar to the operation of the embodiment of FIGS. 7-8.

Figure 11:
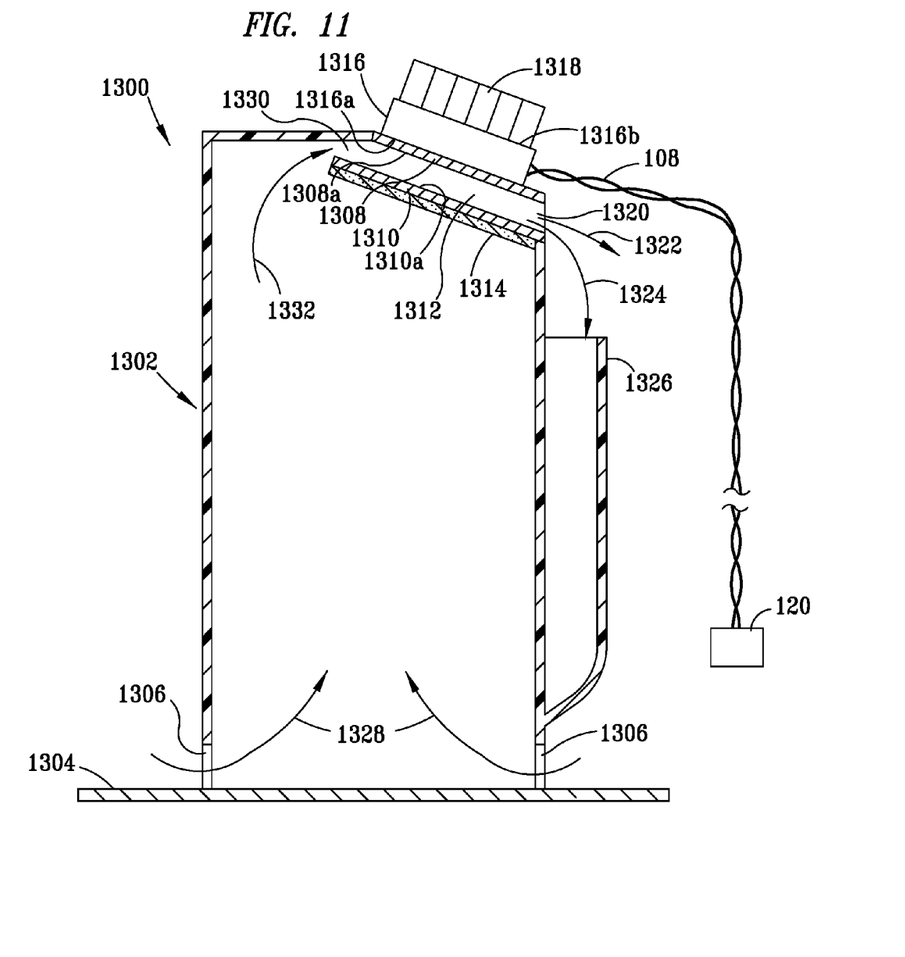

FIG. 11 exemplifies a water recovery system 1300 according to a further alternate embodiment of the present invention. Water recovery system 1300 includes a column 1302, preferably comprising a material that allows light to pass through, such as clear plastic. Column 1302 may be defined by any suitable cross-section, such as square or round. Column 1302 is preferably seated on a base plate 1304 having a non-reflective surface and heat-absorbing color, such as black, for absorbing heat energy from the sun, and for heating air within column 1302, thereby causing air in the column to rise upwardly. Openings 1306 are defined in a lower portion of column 1302 for allowing air to enter into column 1302, indicated by arrows 1328, as air in column 1302 rises upwardly.

An upper portion of column 1302 is sealed, but for a condenser passageway 1312 defined by an upper plate 1308 and a lower plate 1310, which plates are arranged at an angle to define an inlet 1330 and an outlet 1320. The plates 1308 and 1310 are preferably fabricated from a thermally conductive material such as copper, and include respective surfaces 1308a and 1310a onto which are preferably formed grooves for facilitating the flow of water droplets passing through passageway 1312. A layer of insulation 1314 is preferably adhered to the bottom side of plate 1310 for preventing the transfer of heat from air in column 1302 to air in passageway 1312, to thereby render the system 1300 more efficient for recovering water from air. An accumulator 1326 is positioned on an exterior surface of column 1302 for collecting water condensed in condenser passageway 1312.

At least one Peltier Junction Module, or thermoelectric cooler (TEC), 1316 is positioned so that a side 1316a of TEC 1316 that is cool in operation is firmly seated against the upper surface of upper plate 1308 to facilitate the transfer of heat from air in passageway 1312 to TEC 1316. A heat sink 1318 is positioned on a side 1316b of TEC 1316 opposite side 1316a for absorbing heat from the TEC and dissipating that heat to the air. While not shown, it is understood that the TEC may be supplied electrical power in any conventional manner, such as by electrical power source 120 via wires 108.

In operation, TEC 1316 is powered on and proceeds to transfer heat from plate 1308 to heat sink 1318, thereby cooling plate 1308. While plate 1308 is cooling, heat energy from the sun passes through the clear walls of column 1302 and heats base plate 1304, which in turn heats air contained within the column until the air is warmed and rises upwardly, as indicated by arrow 1332, toward inlet 1330 of passageway 1312. As the warm air rises, a pressure drop in column 1302 draws more air into the column through openings 1306, as indicated by arrows 1328. As warm air passes through inlet 1330 into passageway 1312, water in the warm air condenses on the cool surface 1308a of plate 1308 and the water droplets either flow down the grooved surface 1308a or fall onto grooved surface 1310a and flow downwardly. As water droplets form on either or both surfaces 1308a and 1310a, they flow downwardly, and are collected in accumulator 1326 for use as desired.

By the use of the present invention, a system and method are disclosed which can recover water from the atmosphere, and which do not require complex equipment and substantial amounts of space and energy to operate.

It is understood that the present invention may take many forms and embodiments. Accordingly, several variations may be made in the foregoing without departing from the spirit or the scope of the invention. For example, column 106 or 506 could operate without funnel 102, or column 106 or 506 could in its entirety constitute a funnel without a cylindrical portion. System 100 may be fabricated without legs 104, and holes may be perforated in funnel 102 to allow for the entry of air therein. Still further, condensers may be modified wherein larger and/or additional TECs 202 are positioned on the interior of walls 111 and arranged thereon (e.g., side-by-side or stacked) and/or shaped to thereby maximize the portion of the surfaces of the walls 111 that are cooled by the TECs. Ducting may be added to the embodiment of FIG. 11 to direct air exiting from outlet 1320 over the heat sink 1318 to facilitate the flow of air and more efficiently operate the system.

In a still further variation of the foregoing, in an alternative to cooling provided by the TECs 202, walls 111 of a respective condenser may be cooled using other cooling and refrigeration technologies, such as natural gas technologies, including (1) a continuous absorption type of cooling unit operated by the application of a limited amount of heat furnished by natural gas (e.g., as developed by Servel, Inc.) (or alternatively, heated by electricity, kerosene, and/or any other suitable fuel), (2) engine driven chillers, (3) desiccant dehumidification systems, (4) heat sinks, and/or the like. It is considered that such alternative cooling technologies are well-known in the art, and that a person skilled in the art, upon a reading of the invention disclosed herein, could implement such technologies and, therefore, will not be discussed in further detail herein.

Corrugated surfaces and fans may be utilized for forced induction of air in any of the embodiments described herein in a manner as would be apparent to a person having ordinary skill in the art upon a reading of this application.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system for recovering water from air, the system comprising:
    a column, at least a portion of which comprises a substantially non-reflective surface effective for absorbing heat energy from the sun and transferring the heat to air in the interior of the column, the column further defining a lower end and an upper end;
    at least one first sheet of thermally conductive material secured within the column;
    at least one second sheet of material secured within the column and positioned substantially parallel to and spaced from the at least one first sheet to define a flow channel between the at least one second sheet and a condensing surface of the at least one first sheet, wherein the at least one first sheet includes an upper portion bent over a top edge of the at least one second sheet and extends to the wall of the column to direct additional air through the flow channel;
    at least one thermoelectric cooler (TEC) having during operation a cool side and a warm side, the cool side being positioned on the at least one first sheet, not in the flow channel, for cooling the at least one first sheet, the at least one first sheet defining the condensing surface opposite the surface on which the TEC is positioned;
    an electrical power source coupled for providing electrical power to the at least one thermoelectric cooler;
    an accumulator coupled in fluid communication with the flow channel for collecting and accumulating water that condenses on and flows through the flow channel; and
    a cover positioned atop the column, the cover being configured for preventing debris in the air from falling into the condenser and accumulator.

2. The system of claim 1, further comprising a heat sink positioned on the warm side of the TEC.

3. The system of claim 1, wherein the first sheet includes an upper portion bent over a top edge of the second sheet to direct additional air through the flow channel.

4. The system of claim 1, wherein the at least one first sheet comprises at least one sheet of metal, and the at least one second sheet comprises at least one sheet of metal.

5. The system of claim 1, wherein the lower end of the column includes a portion configured as a funnel having a substantially non-reflective surface effective for absorbing heat energy from the sun and transferring the heat energy to air inside the funnel.

6. The system of claim 1, wherein the lower end of the column includes a portion configured as a funnel having a substantially non-reflective surface effective for absorbing heat energy from the sun and transferring the heat energy to air inside the funnel, and for directing air to the condensing surface.

7. The system of claim 1, wherein the lower end of the column includes a portion configured as a funnel having a substantially non-reflective surface effective for absorbing heat energy from the sun and transferring the heat energy to air inside the funnel; and the funnel further comprises legs secured to the funnel portion for supporting the funnel portion and column in an elevated position.

8. The system of claim 1, wherein the column is an auxiliary column, and the system further comprises a primary column coupled in fluid communication to the auxiliary column.

9. The system of claim 1, wherein the column is an auxiliary column, and the system further comprises a primary column coupled in fluid communication to the auxiliary column; and wherein the primary column defines an open lower end and an open upper end, and the lower end of the primary column includes a portion configured as a funnel having a substantially non-reflective surface effective for absorbing heat energy from the sun and transferring the heat energy to air inside the funnel.

10. The system of claim 1, wherein the at least one second piece of sheet metal includes a layer of insulation positioned on the surface opposite the flow channel.

11. The system of claim 1, wherein the power supply includes at least one solar panel configured for converting solar energy to electrical energy effective for operating the thermoelectric coolers.

12. The system of claim 1, wherein the power supply includes at least one battery effective for supplying electrical energy to the thermoelectric coolers.

13. The system of claim 1, wherein the power supply includes at least one battery and at least one solar panel coupled with the at least one battery, the solar panel being configured for converting solar energy to electrical energy effective for operating the thermoelectric coolers.

14. The system of claim 1, wherein the at least one condensing surface is a conical surface.

15. The system of claim 1, wherein the condenser is positioned in an upper portion of the column.

16. The system of claim 1, wherein the cover extends continuously across a central portion of the cover.

17. A system for recovering water from air, the system comprising:
- a column, at least a portion of which comprises a substantially non-reflective surface effective for absorbing heat energy from the sun and transferring the heat to air in the interior of the column, the column further defining a lower end and an upper end;
- at least one first sheet of thermally conductive material secured within the column;
- at least one second sheet of material secured within the column and positioned substantially parallel to and spaced from the at least one first sheet to define a flow channel between the at least one second sheet and a condensing surface of the at least one first sheet, wherein the at least one first sheet includes an upper portion bent over a top edge of the at least one second sheet and extends to the wall of the column to direct additional air through the flow channel;
- at least one thermoelectric cooler (TEC) having during operation a cool side and a warm side, the cool side being positioned on the at least one first sheet, not in the flow channel, for cooling the at least one first sheet, the at least one first sheet defining the condensing surface opposite the surface on which the TEC is positioned;
- an electrical power source coupled for providing electrical power to the at least one thermoelectric cooler; and
- an accumulator coupled in fluid communication with the flow channel for collecting and accumulating water that condenses on and flows through the flow channel.

18. A system for recovering water from air, the system comprising:
- a column, at least a portion of which comprises a substantially non-reflective surface effective for absorbing heat energy from the sun and transferring the heat to air in the interior of the column, the column further defining a lower end and an upper end;
- at least one first sheet of thermally conductive material secured within the column;
- at least one second sheet of material secured within the column and positioned substantially parallel to and spaced from the at least one first sheet to define a flow channel between the at least one second sheet and a condensing surface of the at least one first sheet;
- at least one thermoelectric cooler (TEC) having during operation a cool side and a warm side, the cool side being positioned on the at least one first sheet, not in the flow channel, for cooling the at least one first sheet, the at least one first sheet defining the condensing surface opposite the surface on which the TEC is positioned;
- an electrical power source coupled for providing electrical power to the at least one thermoelectric cooler;
- an accumulator coupled in fluid communication with the flow channel for collecting and accumulating water that condenses on and flows through the flow channel; and
- a cover positioned atop the column, the cover being configured for preventing debris in the air from falling into the condenser and accumulator.

* * * * *